(12) United States Patent
Storey

(10) Patent No.: US 6,270,117 B1
(45) Date of Patent: Aug. 7, 2001

(54) DECELERATION SENSOR FOR VEHICLE AIR BAG

(75) Inventor: Edwin Charles Storey, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/502,634

(22) Filed: Feb. 11, 2000

(51) Int. Cl.$^7$ .................................................... B60R 21/32
(52) U.S. Cl. ............................ 280/735; 250/221; 280/734
(58) Field of Search ....................................... 280/734, 735; 73/862, 624; 250/221, 222.1, 227.11, 227.14, 483.1

(56) References Cited

FOREIGN PATENT DOCUMENTS

| | | | |
|---|---|---|---|
| 3231800 | * 3/1984 | (DE) | ...................................... 280/735 |
| 4017396 | * 12/1991 | (DE) | ...................................... 280/734 |
| 5-139243 | * 6/1993 | (JP) | ...................................... 280/734 |

* cited by examiner

Primary Examiner—Eric Culbreth
(74) Attorney, Agent, or Firm—Margaret A. Dobrowitsky

(57) ABSTRACT

A method for activating air bags in motor vehicles without the use of electrically powered deceleration sensors. This method utilizes the impact of one mass of quartz against another to generate a flash of visible light to initiate activation of the air bag system under conditions of extremely sudden deceleration. This flash of light, which is detected by a photo-sensitive element, initiates deployment of the air bag system without reliance on the electrical cables currently used for this purpose, but which could be damaged in the first moment of a collision, thus preventing inflation of the air bags. This substitution of a photo-sensitive activation system for a system dependent on electric cables substantially enhances the reliability of the air bag deployment concept.

10 Claims, 1 Drawing Sheet

DECELERATION SENSOR FOR VEHICLE AIR BAG

TECHNICAL FIELD

The present invention relates to vehicle air bag actuating systems.

BACKGROUND OF THE INVENTION

Vehicle air bags are provided to protect occupants of vehicles during collisions. To cause the air bags to inflate, deceleration sensors have been provided that generate signals representative of sudden vehicle deceleration. When the sensed deceleration exceeds a threshold, a collision signal is generated. This signal is sent to an air bag actuator to cause the actuator to rapidly inflate the air bag.

Existing deceleration sensors use electric power which must be carried to the sensors to actuate them. To prevent electromagnetic interference (EMI) from other components of the vehicle from unduly affecting the performance of the air bag inflation system, the electric wires that carry the signals to the sensors must be shielded, adding to the cost and complexity of the system. Additionally, the use of electric deceleration sensors frequently entails using gold contacts, which can be expensive. Moreover, steps must be taken to ensure that power is not lost to the sensors during a collision. In those accidents in which the first components of the vehicle to be seriously damaged include the electrical cable that activates the air bag, there is a significant risk that the air bags will not deploy, thus depriving the occupants of their vehicle of their protection.

The present invention recognizes that the above-stated drawbacks are inherent with deceleration sensors that output electric signals representative of a vehicle's deceleration. Fortunately, the present invention understands that an effective, simple, low-cost deceleration sensor can be provided that does not require or consume electric power.

SUMMARY OF THE INVENTION

The present invention is a deceleration sensor incorporating a means of triggering the activation of vehicle air bags without relying upon electrical cables, which may be subject to damage in a severe collision. Freedom from reliance upon these cables significantly increases the reliability of the air bag system.

The present invention overcomes the disadvantages of conventional vehicle air bag deceleration sensing devices by utilizing the triboluminescent properties of a material, preferably quartz, to generate a flash of light. This light is sensed by a photo-electric detector and sent to a controller. Once the controller has been activated, the air bag is inflated.

The preferred embodiment of the present invention utilizes two quartz masses, one fixed and the other positioned in such a way that it will come into forceful direct or indirect contact with the fixed mass when the vehicle experiences the type of extremely rapid deceleration characteristic of high-speed collisions. This will cause a compression of the structure of the quartz crystals sufficient to generate a flash of light. A spring-like energy absorber prevents the moveable quartz mass from impacting against the fixed quartz mass until extremely rapid deceleration occurs.

In another aspect, a deceleration sensor for a vehicle includes at least one triboluminescent mass positionable on the vehicle and at least one contact mass mountable on the vehicle and oriented to move toward the triboluminescent mass to impart sufficient energy to the triboluminescent mass to cause the triboluminescent mass to generate a light signal when a deceleration indicative of a collision occurs.

In another aspect, a method for actuating a vehicle component such as an air bag having a component actuator includes providing a triboluminescent mass on a vehicle, and also providing a contact mass on the vehicle. At least one of the masses is enabled to move under the influence of deceleration such that the masses move toward each other with a force sufficient to cause the triboluminescent mass to generate a light signal when a predetermined deceleration occurs. The method then includes transforming the light signal to a control signal and using the control signal to actuate the vehicle component.

The details of the present invention, both as to its structure and operation, can best be understood in reference to the accompanying drawings, in which like reference numerals refer to like parts, and in which:

DESCRIPTION OF AN EMBODIMENT OF THE INVENTION

Figure 1:
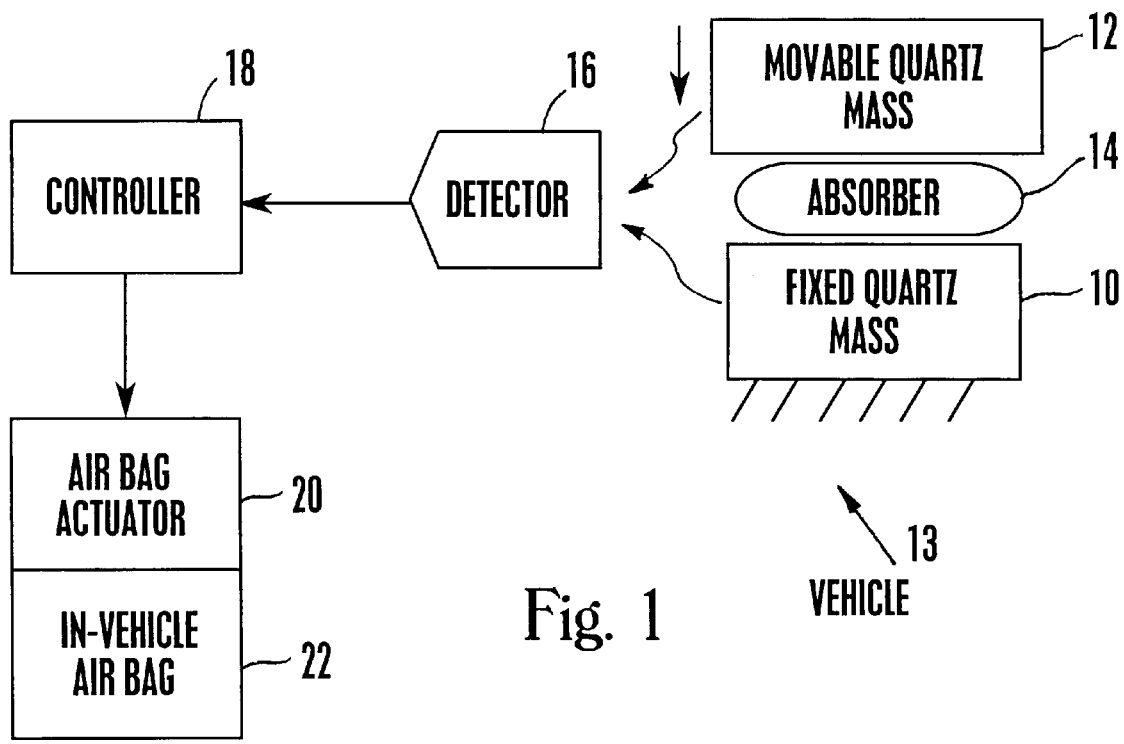
FIG. 1 is a schematic representation of the present invention.

Referring initially to FIG. 1, a triboluminescent mass, preferably a fixed quartz mass, is shown and designated 10. It is to be understood that triboluminescent materials other than quartz can be used. Also, a contact mass, preferably made of quartz and movable relative to the fixed mass 10, is shown and designated 12. Both masses 10, 12 are positioned in a vehicle, generally designated 13. The two quartz masses are oriented and mounted with respect to one another in such a way that under conditions of extreme vehicle deceleration the moveable quartz mass 12 will move toward the fixed quartz mass 10 to impart sufficient energy to the fixed quartz mass 10 to produce a flash of visible light, from either one (or both) of the masses 10, 12. Either one or both of the masses 10, 12 may be triboluminescent.

The moveable quartz mass 12 is prevented from imparting enough energy to the fixed quartz mass 10 to cause a flash of flight under non-collision deceleration by an energy absorber, designated 14, that can be sandwiched between the masses 10, 12. In one embodiment, the energy absorber 14 is a spring, although it could be, e.g., a resilient piece of material, such as rubber, or a spring-loaded detent. It will be appreciated that in the embodiment shown, the contact mass 12 indirectly contacts, through the absorber 14, the fixed mass 10 to cause the fixed mass 10 to emit light when the deceleration is sufficiently strong, indicating a collision. Alternatively, the energy absorber 14 need not be sandwiched between the masses 10, 12, but can be a tension spring attached to the surface of the movable mass 12 that faces away from the fixed mass 10. In this. alternative embodiment, it will be appreciated that the contact mass 12 directly contacts the fixed mass 10. In either case, the contact mass 12 moves toward the fixed mass 10 to impart energy to the fixed mass 10 that is sufficient to cause the fixed mass 10 to emit light only when a relatively large, predetermined deceleration, i.e., one indicative of a collision, is present.

The relative motion between the fixed and moveable quartz masses 10, 12 may be produced in several different ways. The moveable quartz mass 12 may be rectangular and affixed to a spring-like device. Alternatively, the moveable quartz mass 12 may be spherical and contained within a tube, in which case the tube would be oriented along the front-to-rear axis of the vehicle 13 and the visible light would be produced when the inertia of the moveable quartz mass 12 forces that mass 12 against a stationary quartz mass 10 at the forward end of the tube.

Regardless of the specific manner in which visible light is produced by the impact of two quartz masses 10, 12, this light is sensed by a detector 16, which transmits an electrical signal to a controller 18. In turn, the controller 18 generates a control signal which is sent to an air bag actuator 20. In response, the actuator 20 generates an actuation signal that is sent to an air bag 22 to inflate the air bag 22.

Figure 2:
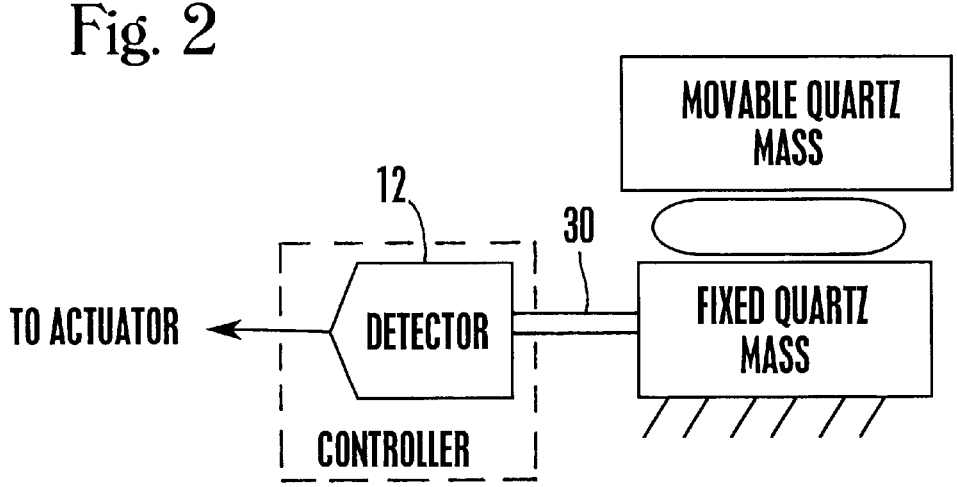
FIG. 2 is a schematic representation of an alternative embodiment, in which an optical fiber is connected to the light detector and positioned with respect to the two quartz masses to carry the light signal to the light detector.

Referring now to FIG. 2, an alternative embodiment is shown. In this embodiment, at least one optical fiber 30 captures the visible light generated by the two quartz masses 10, 12 and transmits this light to the detector 16. If desired, the detector 16 can be internal to a controller that functions like the controller 18 shown and described above. It is to be understood that if desired, multiple fibers can extend from multiple triboluminescent sensors and terminate at the detector, e.g., a second fiber (not shown) can extend from the "movable quartz mass" shown in FIG. 2 to the detector 12.

While the particular DECELERATION SENSOR FOR VEHICLE AIR BAG as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims.

No claim element herein is to be construed under the provisions of 35 U.S.C. §112, sixth paragraph, unless the element is expressly recited using the phrase "means for".

What is claimed is:

1. A deceleration sensor for a vehicle, comprising:
   at least one triboluminescent mass positionable on the vehicle; and
   at least one contact mass mountable on the vehicle and oriented to move toward the triboluminescent mass to impart sufficient energy to the triboluminescent mass to cause the triboluminescent mass to generate a light signal when a deceleration indicative of a collision occurs.

2. The sensor of claim 1, further comprising at least one absorber disposed between the masses, wherein one of the masses is affixable to the vehicle and the other mass is movably mountable on the vehicle.

3. The sensor of claim 2, wherein the absorber is a spring.

4. The sensor of claim 1, wherein the contact mass is a triboluminescent mass.

5. The sensor of claim 1, further comprising a light detector positionable on the vehicle to detect the light signal and to generate an electric signal in response thereto.

6. The sensor of claim 5, further comprising a controller connected to the light detector for receiving the electric signal, and an actuator electrically connected to the controller for generating an actuation signal.

7. The sensor of claim 6, wherein the actuator is an air bag actuator and the sensor further comprises an air bag, the air bag being actuated by the actuator when the triboluminescent mass generates the light signal.

8. The sensor of claim 5, further comprising at least one optical fiber connected to the light detector and oriented with respect to the masses to carry the light signal to the light detector.

9. The sensor of claim 1, wherein at least the triboluminescent mass is quartz.

10. A method for actuating a vehicle component having a component actuator, comprising the acts of:
    providing a triboluminescent mass on a vehicle;
    providing a contact mass on the vehicle;
    enabling at least one of the masses to move under the influence of deceleration such that the masses move toward each other with a force sufficient to cause the triboluminescent mass to generate a light signal when a predetermined deceleration occurs;
    transforming the light signal to a control signal; and
    using the control signal to actuate the vehicle component.

* * * * *